(12) United States Patent
Okuno et al.

(10) Patent No.: US 6,837,109 B2
(45) Date of Patent: Jan. 4, 2005

(54) MATERIAL THICKNESS MEASUREMENT METHOD AND APPARATUS

(75) Inventors: Makoto Okuno, Chiba (JP); Hideo Sato, Aichi (JP); Marvin B. Klein, Culver City, CA (US); Bruno F. Pouet, Culver City, CA (US)

(73) Assignees: Kawasaki Steel Corporation, Kobe (JP); Lasson Technologies, Inc., Culver City, CA (US)

( * ) Notice: Subject to any disclaimer, the term of this patent is extended or adjusted under 35 U.S.C. 154(b) by 263 days.

(21) Appl. No.: 10/287,607

(22) Filed: Nov. 5, 2002

(65) Prior Publication Data

US 2004/0085550 A1 May 6, 2004

(51) Int. Cl.$^7$ .............................................. G01B 17/02
(52) U.S. Cl. ..................... 73/597; 356/502; 356/503; 374/119
(58) Field of Search ......................... 73/597, 627, 655, 73/657; 356/502, 503; 374/119

(56) References Cited

U.S. PATENT DOCUMENTS

| | | | | |
|---|---|---|---|---|
| 5,604,592 A | * | 2/1997 | Kotidis et al. | 356/502 |
| 6,057,927 A | * | 5/2000 | Levesque et al. | 356/502 |
| 6,078,397 A | | 6/2000 | Monchalin et al. | 356/502 |

FOREIGN PATENT DOCUMENTS

JP    A 54-97447    8/1979

OTHER PUBLICATIONS

J. Krautkramer et al., Ultrasonic Testing of Materials, 3rd Edition, Springer–Verlag New York, 1983, pp. 318–324.*
Monchalin, "Progress Towards The Application Of Laser–Ultrasonics In Industry", Review of Progress in Quantitative Nondestructive Evaluation, vol. 12, pp. 495–506, 1993.
Monchalin et al., "Wall Thickness Measurement of Tubes and Eccentricity Determination by Laser–Ultrasonics", Proceedings of the 39$^{th}$ Mechanical Work Steel Process Conference, ISS, vol. XXXV, p. 927, 1998.

* cited by examiner

*Primary Examiner*—John E. Chapman
(74) *Attorney, Agent, or Firm*—Oliff & Berridge, PLC

(57) ABSTRACT

Longitudinal and shear ultrasonic waves are generated inside a material by irradiating a laser beam onto a first surface, e.g., incident surface, of the material. An ultrasonic longitudinal wave and a mode converted wave reflected by a second surface, e.g., a bottom surface, of the material are detected, and times of flight of the ultrasonic longitudinal wave and the mode converted wave are measured. A thickness of the material is measured based on the times of flight and a correlation, obtained in advance, between longitudinal and shear wave velocities of the material and temperature of the material.

8 Claims, 6 Drawing Sheets

MATERIAL THICKNESS MEASUREMENT METHOD AND APPARATUS

BACKGROUND OF THE INVENTION

1. Field of Invention

This invention relates to a method and apparatus that measure material thickness using an ultrasonic wave, and particularly to a method and apparatus that are suitable for measuring material thickness in an environment in which temperature of the material significantly changes.

2. Description of Related Art

As a material thickness measurement method, a method is well known in which an ultrasonic wave is transmitted in a material thickness direction and the material thickness is measured from the product of the time of flight and the ultrasonic wave velocity of the material. Many thickness measuring devices using this method are sold in the market. FIG. 1 schematically shows a material thickness measurement principle according to this method. Hereafter, a material thickness measurement method using an ultrasonic wave is explained based on FIG. 1.

FIG. 1 shows a conventional thickness measuring device 100. An ultrasonic wave probe 110 constituted by a piezoelectric transducer or the like contacts the surface of a material M, with glycerol or the like as a couplant, and an ultrasonic longitudinal wave, produced by an ultrasonic wave transmitter 120, is generated inside the material M via this ultrasonic wave probe 110. This longitudinal wave is reflected by a bottom surface of the material M, and returns to the incident surface of the material M that is contacted by the probe. When the longitudinal wave returns to the incident surface, the incident surface has a transient displacement that is proportional to the amplitude of the arriving longitudinal wave. This displacement of the surface of material M is received by the same ultrasonic wave probe 110 as is used for ultrasonic wave generation.

FIG. 2 schematically shows the received waveform at this time. T shows the transmitted pulse, and 2L and 4L show first and second bottom surface echoes which have echoed once and twice, respectively, within the material M. An arrival time interval $t_{2L}$ of the pulses T and 2L is measured by a longitudinal wave time of flight measuring device 130. A calculator 140 calculates the material thickness D by using this arrival time interval $t_{2L}$, and an ultrasonic longitudinal wave acoustic velocity $V_L$ of the material which was obtained in advance. The material thickness D is obtained by the following equation (1).

$$D = V_L \cdot t_{2L}/2 \qquad (1)$$

Alternatively, the material thickness D can be calculated by measuring the arrival time interval $t_{2L}'$ of the pulses 2L and 4L by the longitudinal wave time of flight measuring device 130, and using the following equation (2).

$$D = V_L \cdot t_{2L}'/2 \qquad (2)$$

In this type of material thickness measurement method, the piezoelectric transducer 110 has to contact the measured material M. Therefore, when the measured material M has a high temperature or moves at a high speed, e.g., such as in a metal manufacturing line, application of this method is difficult. Furthermore, the velocity $V_L$ of the ultrasonic wave significantly changes depending on the material temperature. Thus, in order to measure the material thickness D with high accuracy, the ultrasonic wave velocity at the time of measurement needs to be accurately obtained by separately detecting the temperature of the material M.

As a method of solving this type of problem, a method using a laser ultrasonic technique and a pyrometer is described in "Proceedings of the 39th Mechanical Work Steel Process Conference", ISS, Vol. XXXV, p.927 (1998), incorporated herein by reference in its entirety. In this method, a high energy pulsed laser beam is irradiated onto a material surface, and ablation is generated in the material surface. An ultrasonic longitudinal wave is transmitted inside the material by the reaction force of the ablation. This longitudinal wave travels through the material and is reflected by the bottom surface of the material. A transient displacement of the material surface is generated when the longitudinal wave returns to the incident surface, and this displacement is detected in a non-contact manner by using an optical interferometer. Separately from the ultrasonic device, a pyrometer is used to monitor the material surface temperature. A correlation of longitudinal wave velocity and material temperature is obtained in advance, and effects due to the change of the material temperature are corrected based on this correlation.

Furthermore, Japanese Laid-Open Patent Application 54-97447 discloses a method in which a material thickness is obtained using times of flight of shear and longitudinal ultrasonic waves generated by an electromagnetic acoustic transducer. In this method, by using two sets of electromagnetic acoustic transducers, the respective ultrasonic longitudinal and shear waves are generated inside the material and detected, and the ratio of the times of flight of the longitudinal and shear waves is obtained. Thereafter, according to a correlation of the time of flight ratio and material temperature that has been obtained in advance, the material temperature is obtained. From the correlation of the time of flight of the shear or longitudinal wave and the material temperature obtained in advance, a velocity of the shear wave or longitudinal wave is obtained. The material thickness is calculated according to the above-mentioned equation (1) or (2). In this method, there is no need for separately arranging a temperature measuring device such as a pyrometer, and the velocity can be corrected by monitoring a material internal temperature instead of a material surface temperature. Therefore, the material thickness can be measured with higher accuracy than in the above-mentioned method using a laser ultrasonic technique and a pyrometer.

Other laser ultrasonic techniques are disclosed in "Progress Towards the Application of Laser-Ultrasonics In Industry", *Review of Progress in Quantitative Nondestructive Evaluation*, Vol. 12, pp.495–506 (1993) and in U.S. Pat. No. 6,078,397 to Monchalin et al., each incorporated herein by reference in its entirety.

SUMMARY OF THE INVENTION

However, in the material thickness measurement method using the laser ultrasonic technique and the pyrometer, (1) there is a need for separately providing a highly accurate pyrometer in order to measure thickness, and the total measuring system becomes complex and expensive, and (2) with a pyrometer, only the material surface temperature can be measured. Meanwhile, ultrasonic wave velocity changes depending on the internal temperature of the material, so when the material surface temperature cannot be considered to be the same as the internal temperature, the measurement accuracy deteriorates. For example, when the material thickness is relatively thick and the material has a high temperature, the temperature of the material surface significantly drops due to heat radiation, compared to the inside of the material, so the latter problem is quite significant.

Furthermore, in the above-mentioned thickness measurement method using the electromagnetic acoustic transducers, (1) in principle, this can be only applied to conductive materials, (2) the measuring head is complicated and large because of necessity for an incorporation of both a longitudinal wave transducer and a shear wave transducer, and (3) the standoff distance between the electromagnetic acoustic transducer and the material surface needs to be extremely small (e.g., 1 mm), so it is difficult to apply to a manufacturing line in which a material moves while wobbling up and down, or to a manufacturing line or the like which processes materials of various thickness values.

An object of this invention is to address the above-mentioned problems, and to provide a material thickness measurement method and apparatus which can be applied to a non-conductive material and measure a material thickness with a simple system configuration, with high accuracy and in a non-contact manner, even in a measurement environment in which the material wobbles and the material temperature significantly changes.

In order to address these problems, a material thickness measuring apparatus includes a laser irradiating device that irradiates a laser beam onto a material surface, an ultrasonic wave detector that detects an ultrasonic wave generated by the laser irradiation and reflected by a material bottom surface and outputs a detection signal, a time of flight measuring device that measures times of flight, in the material, of an ultrasonic longitudinal wave and a mode converted wave based on the detection signal, and a calculator that calculates a material thickness based on the times of flight and a correlation between longitudinal and shear wave velocities and temperature of the material which has been obtained in advance. The ultrasonic wave detector may, for example, be constituted by a laser oscillation device and an optical interferometer.

In a method according to the invention, an ultrasonic wave is generated inside a material by irradiating a laser beam onto a material surface, an ultrasonic longitudinal wave and a mode converted wave reflected by a bottom surface of the material are detected, and a detection signal is output based on this detection. Times of flight, in the material, of the ultrasonic longitudinal wave and the mode converted wave are measured based on the detection signal, and a material thickness is obtained based on the times of flight and a correlation, which was obtained in advance, between longitudinal and shear wave acoustic velocities of the material and temperature of the material.

These and other objects, advantages and salient features of the invention will be described in or apparent from the following description of exemplary embodiments.

BRIEF DESCRIPTION OF THE DRAWINGS

The invention will be described in conjunction with the drawings, in which like numerals represent like parts, and wherein.

DETAILED DESCRIPTION OF PREFERRED EMBODIMENTS

Figure 1:
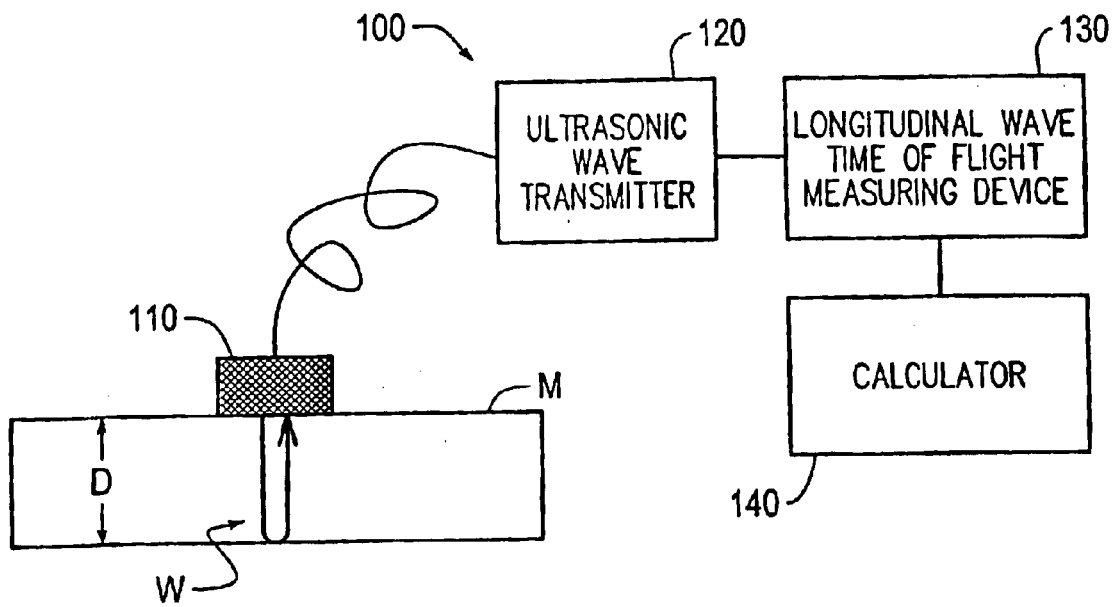
FIG. 1 is a schematic view of a conventional material thickness measuring device.
Figure 2:
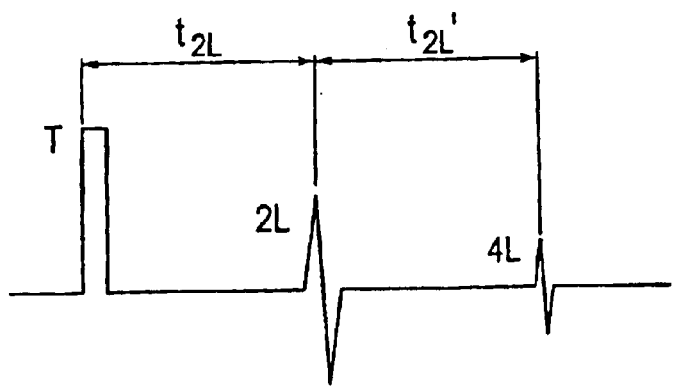
FIG. 2 is a diagram showing an ultrasonic wave detecting waveform in a conventional material thickness measurement method.
Figure 3:
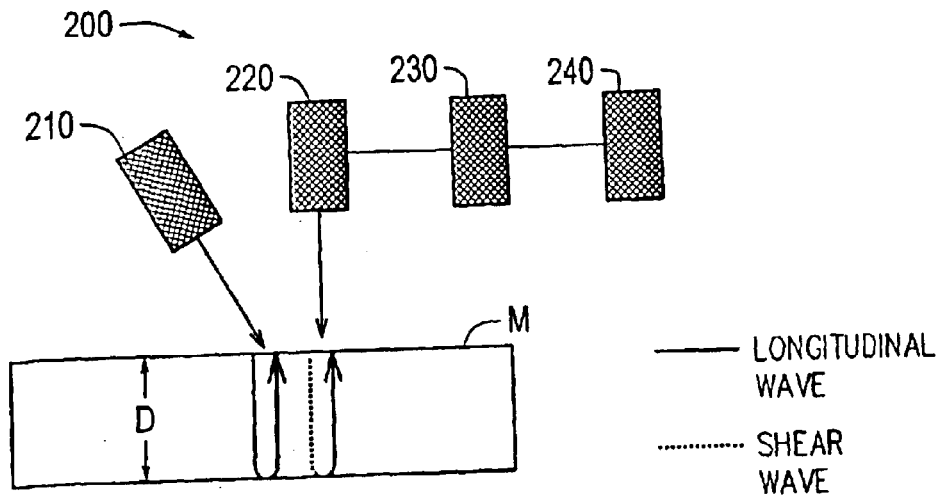
FIG. 3 is a diagram showing a structure of a material thickness measuring device according to this invention.
Figure 4:
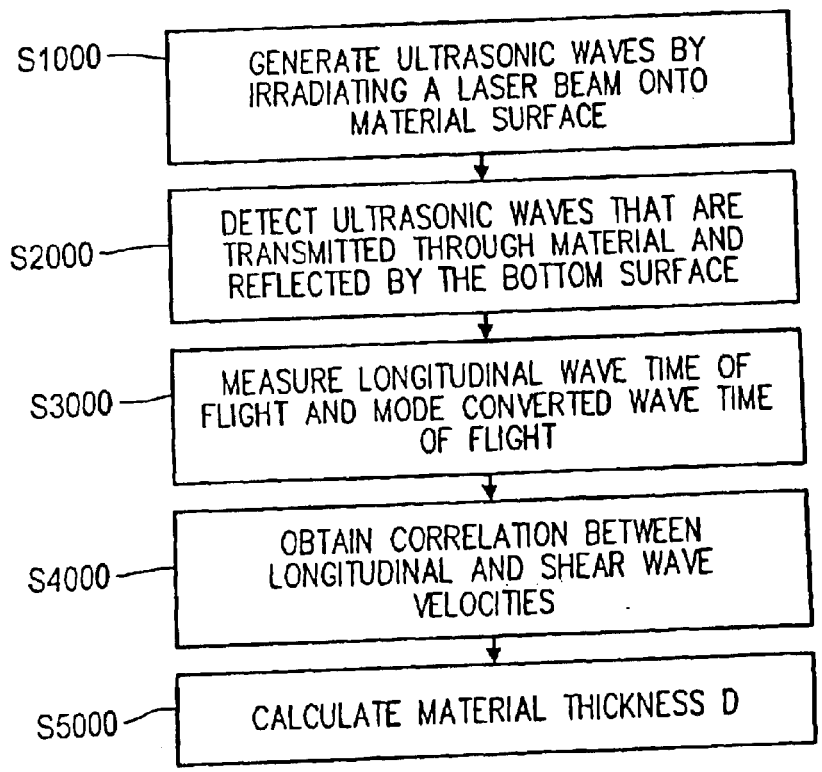
FIG. 4 is a flowchart illustrating a method of material thickness measurement according to this invention.

FIG. 3 shows an exemplary embodiment of a material thickness measuring device 200 according to this invention. Furthermore, FIG. 4 shows a flowchart of a material thickness measurement method according to this invention. Hereafter, embodiments of this invention are described in detail based on FIGS. 3 and 4.

In FIG. 3, the material thickness measuring device 200 includes a laser irradiating device 210, an ultrasonic wave detector 220, a time of flight measuring device 230 and a calculator 240.

The laser irradiating device 210 irradiates a laser beam onto a surface of a material M to be measured. An ultrasonic wave is generated inside the material M by a reaction force of ablation of the material surface, or by a thermo-elastic effect of the material surface (step S1000 of FIG. 4). At this time, ultrasonic longitudinal and shear waves are simultaneously generated inside the material M. After the ultrasonic longitudinal waves which are thus generated are transmitted inside the material M and reflected by a second surface, e.g., the bottom surface of the material M, they are transmitted inside the material in a reverse direction and reach the incident surface of the material M, i.e., the laser irradiated surface. However, at the bottom surface of the material M, part of the longitudinal wave is converted (mode converted) to a shear wave and reflected, and reaches the incident surface.

In the same manner, part of the shear wave generated by laser irradiation is mode converted to a longitudinal wave at the bottom surface of the material, and is transmitted inside the material M in a reverse direction and reaches the incident surface. When the longitudinal and shear waves and mode converted waves reflected by the bottom surface of the material M reach the incident surface, the incident surface is displaced in proportion to the amplitudes of the arriving ultrasonic waves. This displacement is detected by an ultrasonic wave detector (step S2000 of FIG. 4).

Figure 5:
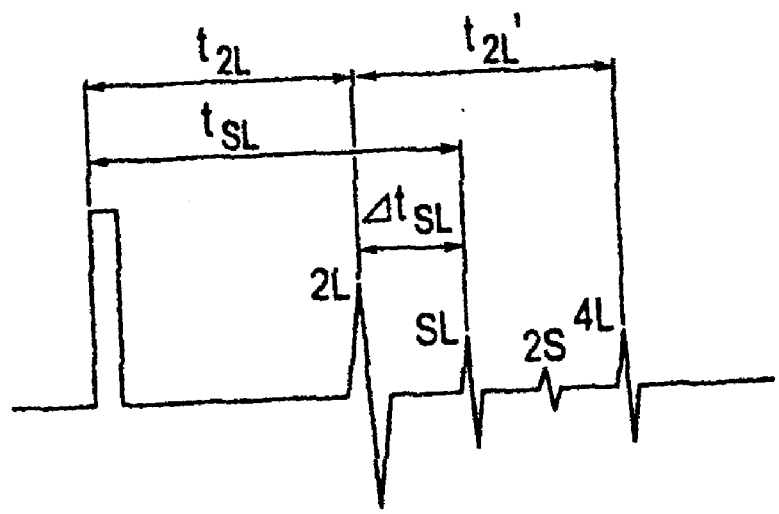
FIG. 5 is a diagram showing an ultrasonic wave detecting waveform in a material thickness measurement method according to this invention.

FIG. 5 schematically shows an example of the ultrasonic waveform which is thus detected. In FIG. 5, pulses 2L and 4L show longitudinal waves which are reciprocated and transmitted once and twice, respectively, in a material thickness direction, pulse 2S shows a shear wave which is reciprocated and transmitted once in the material thickness direction, and pulse SL shows a mode converted wave which is reciprocated and transmitted once in the material thickness direction. In the pulse SL, there is a component for which the approach path is a longitudinal wave and the return path is a shear wave, and there is also a component for which the approach path is a shear wave and the return path is a longitudinal wave. These components are superimposed and detected.

As the above-mentioned laser irradiating device 210, a pulse oscillation laser, such as a Q-switched Nd:YAG laser or the like, is suitable. Furthermore, in order to effectively generate an ultrasonic wave in the material M by irradiating a laser beam, the laser beam can be focused by a focusing lens and irradiated onto the material M to be measured. Furthermore, as the above-mentioned ultrasonic wave detector 220, a piezoelectric probe, an electromagnetic ultrasonic wave probe, or the like can be used. However, preferably, the ultrasonic wave can be detected at a pin point and without contacting the material, that is, it is preferable that the structure is constituted by an ultrasonic wave detecting laser and an optical interferometer such as are used generally in a laser ultrasonic technique. In this case, as an ultrasonic wave detecting laser, a continuous oscillation laser or a pulse oscillation laser can be used. Furthermore, as an optical interferometer, a confocal Fabry-Perot interferometer, an optical interferometer using a photorefractive effect or a nonsteady-state photoelectromotive force effect, or the like can be used.

Next, from the ultrasonic wave detection signal shown in FIG. 5, a longitudinal wave time of flight $t_{2L}$ and a mode converted wave time of flight $t_{SL}$ are measured by the time of flight measuring device 230 (step S3000 in FIG. 4). As the time of flight measuring device 230, a time of flight measuring device which is used for conventional ultrasonic wave thickness measurement can be used. By measuring the time of flight of both the mode converted wave and the longitudinal wave and performing a calculation process described hereafter, a material thickness in which the effect of the time elapse change of the material temperature or the absolute value of the material temperature is automatically corrected can be calculated with high accuracy.

Furthermore, a method can also be considered in which the times of flight of longitudinal and shear waves are measured, and the ratio of the transmission times of the longitudinal and shear waves is obtained. This ratio has a strong correlation with the material temperature. However, a shear wave generated by laser beam irradiation has relatively less energy than a longitudinal wave or a mode converted wave whose energy is transmitted in a direction substantially perpendicular to the material surface (see FIG. 5). Therefore, there is a problem that time of flight measurement is difficult, and time of flight measurement accuracy is low. Furthermore, when an optical interferometer is used as the ultrasonic wave detector 220, a longitudinal wave, whose out-of-plane displacement is dominant, is more detectable at a high degree of sensitivity than a shear wave, whose in-plane displacement is dominant, and it is difficult to detect a shear wave reflected pulse 2S with a sufficiently large SNR (signal-to-noise ratio).

In step S4000 of FIG. 4, a correlation between longitudinal and shear wave velocities and temperature is obtained. It should be appreciated that this correlation may have been obtained at any time in the past, and typically will have been stored in memory and then retrieved when needed.

Next, by the calculator 240, the material thickness D is calculated using the $t_{2L}$ and $t_{SL}$ measured in step S3000 and the correlation of the material temperature and the shear and longitudinal wave velocities relating to the material M of the measured object (step S5000 of FIG. 4).

Figure 6:
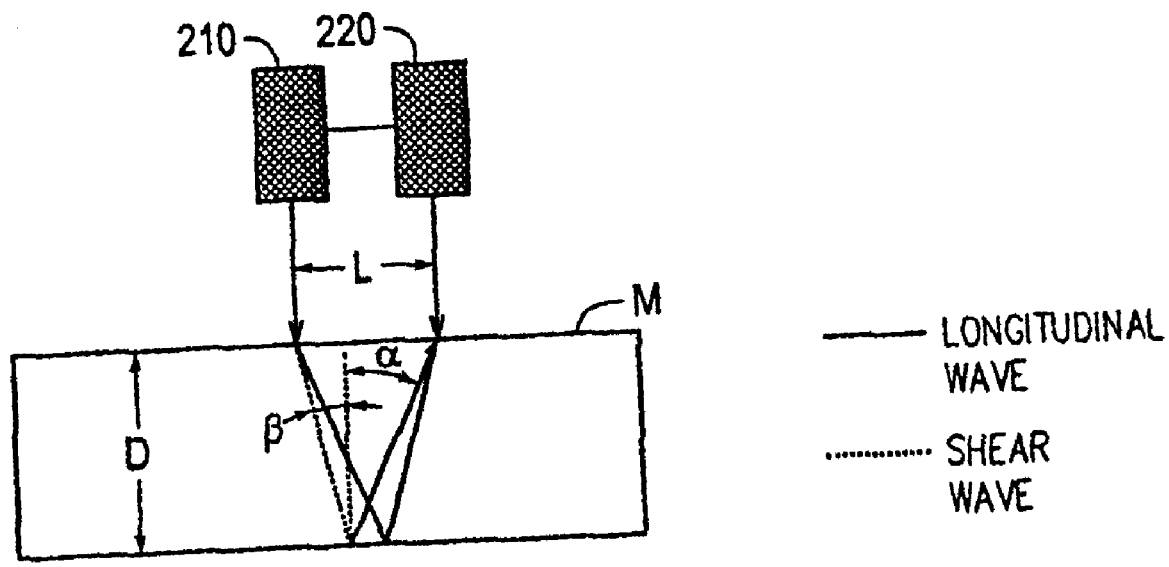
FIG. 6 is a diagram showing a transmission route of a mode converted wave and a longitudinal wave.

The following describes another exemplary embodiment, and describes in detail an exemplary thickness calculation method that may be performed by a calculator 240. In the embodiment shown in FIG. 3, the position at which a laser beam is irradiated by the laser irradiation device 210 and a position at which the ultrasonic wave detector 220 performs ultrasonic wave detection are virtually the same position (although the positions are shown separated in FIG. 3 for clarity). However, in the embodiment shown in FIG. 6, there is a separation between the position at which a laser beam is irradiated by the laser irradiation device 210 and the position at which the ultrasonic wave detector 220 performs ultrasonic wave detection. Specifically, on the surface of a material M to be measured, the distance between a position at which a laser beam is irradiated by the laser irradiation device 210 and a position at which the ultrasonic wave detector 220 performs ultrasonic wave detection is L, as shown in FIG. 6. Furthermore, as shown in FIG. 6, a material thickness is D, longitudinal and shear wave velocities within the material M are $V_L$ and $V_S$, respectively, and incident reflective angles of mode converted waves at the material bottom surface are α and β, respectively. At this time, the times of flight $t_{2L}$ and $t_{SL}$ of the longitudinal wave and the mode converted wave are shown in equations (3) and (4) according to a geometric relationship. Furthermore, equation (5) is obtained from the Snell Laws, and equation (6) is obtained from the geometric positional relationship.

$$t_{2L} = \frac{2\sqrt{D^2 + (L/2)^2}}{V_L} \quad (3)$$

$$t_{SL} = \frac{D}{V_L \cos\alpha} + \frac{D}{V_S \cos\beta} \quad (4)$$

$$\frac{V_L}{V_S} = \frac{\sin\alpha}{\sin\beta} \quad (5)$$

$$D(\tan\alpha + \tan\beta) = L \quad (6)$$

Figure 7:
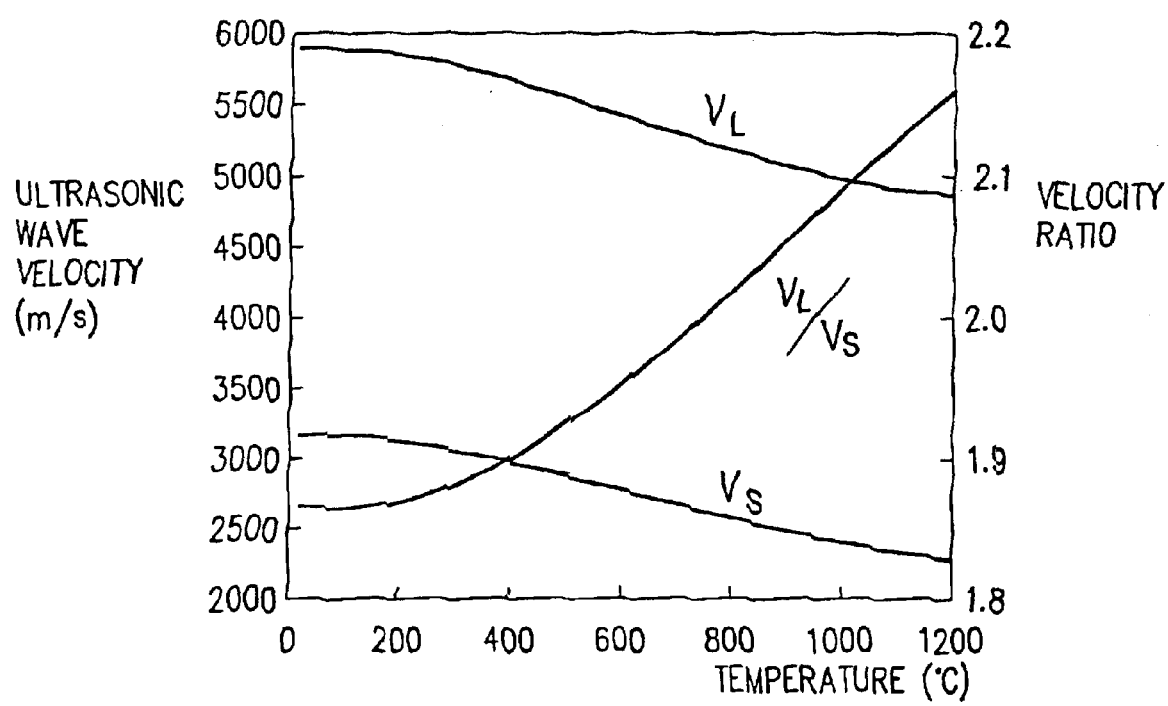
FIG. 7 is a characteristic diagram showing one example of temperature dependency of longitudinal wave and shear wave velocities.

In general, a velocity of an ultrasonic wave changes according to the temperature of the material through which the wave is transmitted. For example, longitudinal and shear wave velocities within carbon steel significantly change according to the material temperature, as shown in FIG. 7. Therefore, excluding the case when the material temperature is considered to be constant, the effects due to the material temperature need to be considered in order to accurately measure the material thickness based on the ultrasonic wave velocity. Because of this, in this invention, as shown in FIG. 7, a correlation among the longitudinal wave velocity $V_L$, shear wave velocity $V_S$, and the material temperature T is obtained in advance. At this time, according to equation (3), the longitudinal wave time of flight is shown as a function of the material thickness D, the material temperature T, and the distance L between the ultrasonic wave transmission positions. That is, the longitudinal wave time of flight can be expressed as:

$$t_{2L} = F\{D, T, L\} \quad (7)$$

Furthermore, according to equations (4), (5), and (6), the mode converted wave time of flight is also shown as a function of the material thickness D, the material temperature T, and the distance L between ultrasonic wave transmission positions. That is, the mode converted wave time of flight can be expressed as:

$$t_{SL} = G\{D, T, L\} \quad (8)$$

The distance L between ultrasonic wave transmission positions is already known, so if the times of flight $t_{2L}$, $t_{SL}$ of the longitudinal wave and the mode converted wave are measured, the material thickness D and the material temperature T can be simultaneously obtained by simultaneously solving equations (7) and (8).

Thus, by measuring the longitudinal wave time of flight $t_{2L}$ and the mode converted wave time of flight $t_{SL}$, the material thickness D and the material internal temperature T can be simultaneously obtained. Therefore, there is no need for separately arranging a temperature sensor such as a pyrometer, as was done in a conventional method. Furthermore, the material thickness can be measured with high accuracy without the measurement error that was present in the case of using a pyrometer due to the difference of the material internal temperature and the material surface temperature.

In the above-mentioned explanation, the case of using $t_{2L}$, shown in FIG. 5, as a longitudinal wave time of flight is shown, but instead of using $t_{2L}$, $t_{2L}'$, shown in FIG. 5, may also be used. Additionally, as a mode converted wave time of flight, instead of $t_{SL}$, shown in FIG. 5, $\Delta t_{SL}$ or the like, shown in FIG. 5, can also be used for measurement. In this case, $t_{2L} = t_{2L}'$ and $\Delta t_{SL} = t_{SL} - t_{2L}$, so the material thickness can be calculated by the same steps as described above.

In the foregoing description, the material thickness D is obtained by simultaneously solving equations (7) and (8); however, the invention is not limited to this. Any method may be used in which the material thickness D is obtained by using a correlation among the material temperature and longitudinal and shear wave velocities obtained in advance, and the relationships of equations (3)–(6).

Furthermore, in the foregoing description, a case is described in which the thickness of a plate-shaped material M is measured, but this invention can also be applied to a case in which thickness of a tube-shaped material is measured.

The following describes an example of steel plate thickness measurement using an apparatus and method according to this invention.

Figure 8:
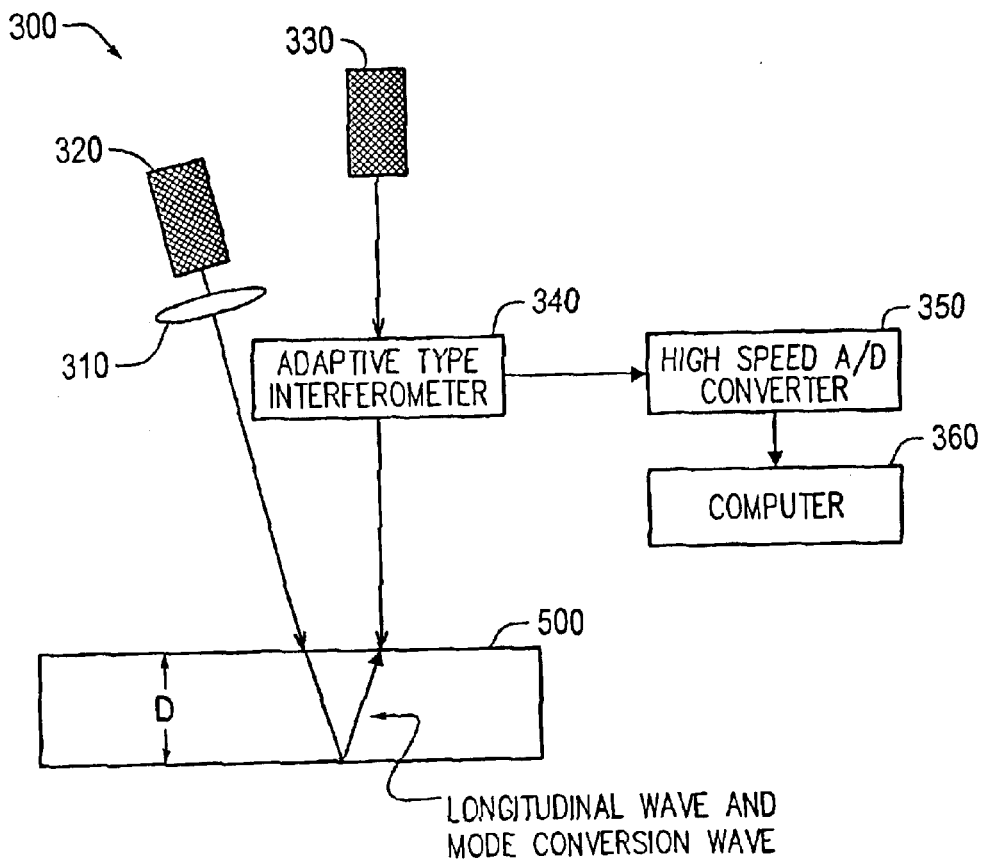
FIG. 8 is a diagram showing an embodiment of a material thickness measuring device according to this invention.

The material measured in this example was a carbon steel plate. The thickness was measured by a contact type micrometer, and the result was 10.70 mm. This steel plate was heated to 25° C. (room temperature), 700° C., 800° C., and 1000° C. within a heating furnace, and the thickness was measured, according to this invention, at the respective temperatures. A schematic of the device 300 used for measurement is shown in FIG. 8. As a laser irradiating device 320, a Q-switched Nd:YAG laser was used that has a wavelength of 1064 nm and an output energy of approximately 200 mJ. A laser beam oscillated from this laser was focused to an approximately 2 mm beam width by a cylindrical lens 310 and irradiated onto the surface of the steel plate 500. As an ultrasonic wave detector 330, an adaptive type interferometer was used that uses a continuous oscillation frequency-doubled Nd:YAG laser (wavelength 532 nm) and a receiver based on the nonsteady-state photoelectromotive force effect.

Figure 9:
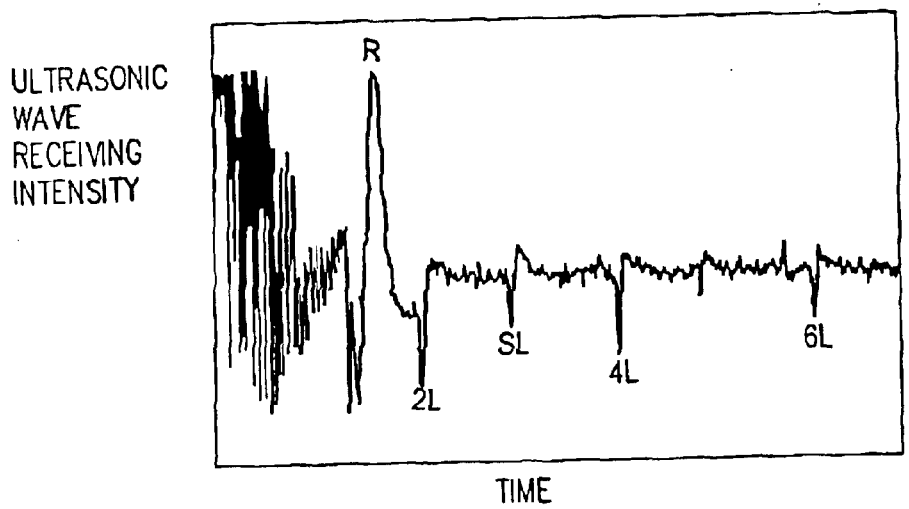
FIG. 9 is a characteristic diagram showing one example of a material thickness measurement waveform according to this invention.

When the distance L between the irradiating positions of the continuous oscillation Nd:YAG detection laser and the Q-switched Nd:YAG generation laser on the steel plate surface is considered, if L is made to be too large, the amplitude of the longitudinal wave echo becomes small, and there is a problem that the longitudinal wave echo overlaps a surface Rayleigh wave echo that is generated simultaneously with the longitudinal and shear waves by laser irradiation. FIG. 9 shows an example of a received ultrasonic waveform from a steel plate of 15.2 mm thickness with L=12 mm. In this example, it can be appreciated that if the value of L is made to be 12 mm or more, the surface Rayleigh wave arrival R overlaps the longitudinal wave echo 2L. On the other hand, it can be appreciated that if L is made to be too small, the mode converted wave echo cannot be detected with a sufficient SNR, and the longitudinal wave echo cannot be clearly detected by the effect of the material surface ablation that accompanies pulse laser irradiation. Therefore, as an appropriate value of L, in this embodiment, measurement was performed using L=4 mm.

Figure 10:
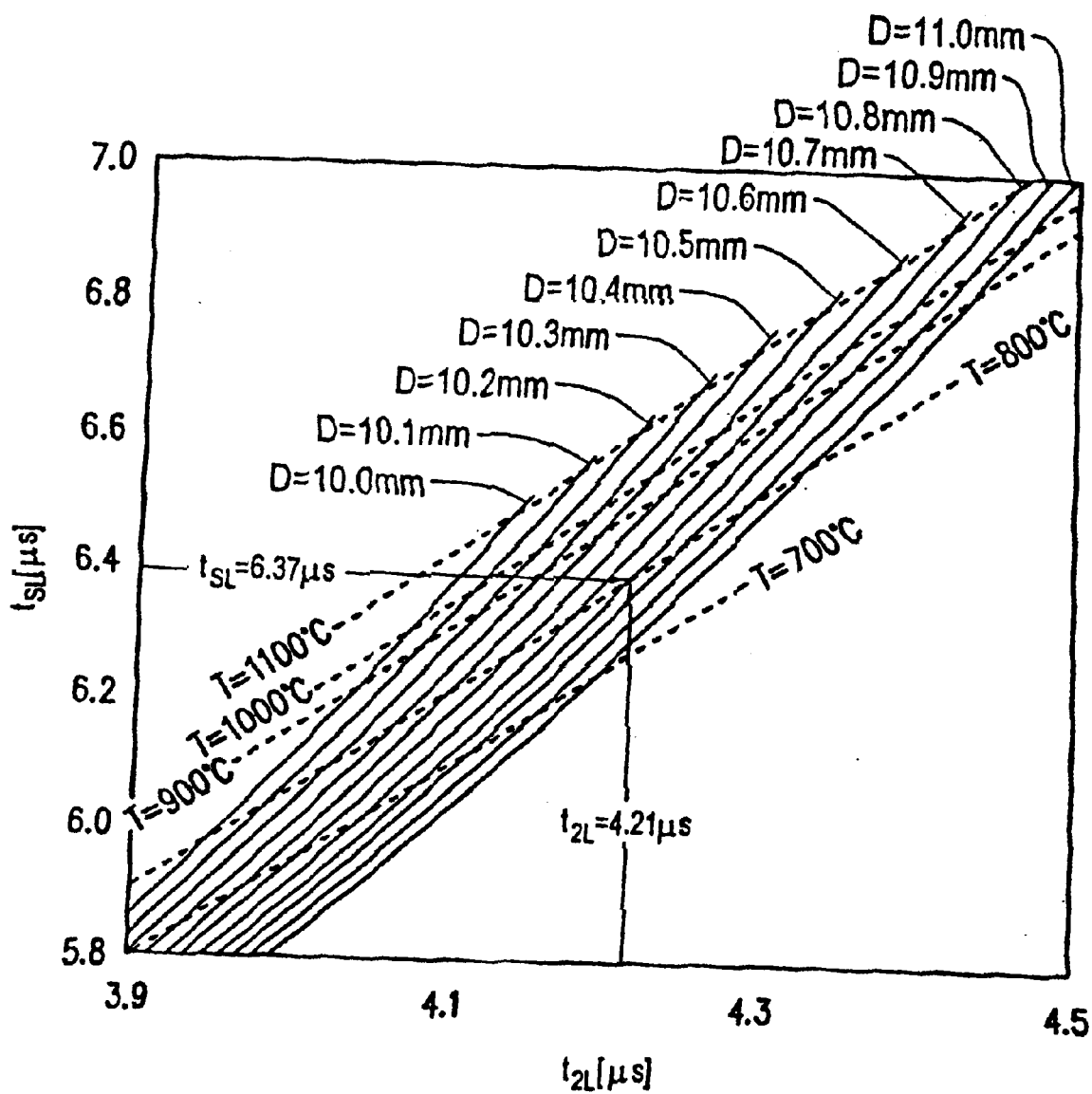
FIG. 10 is a characteristic diagram showing one example of a material thickness calculation procedure according to this invention.

A high speed A/D converter 350 was used as a time of flight measuring device, and a computer 360 was used as a calculator. That is, after the output of the interferometer was taken into the high speed A/D converter 350 via a band pass filter (not shown) and converted into digital data, it was transferred to the computer 360 at high speed. By using software calculations in the computer 360, the time difference $t_{2L}'$ of the longitudinal wave echoes 2L and 4L which are reciprocated and transmitted once and twice, respectively, within the steel plate 500, and the time difference $\Delta t_{SL}$ between the above-mentioned 2L and a mode converted wave echo SL which is mode-converted at the steel plate bottom surface were obtained. Using the steel plate of the same material type as was used in this example, the relations between velocity and temperature shown in FIG. 7 were obtained in advance. Based on these, by using equations (3)–(6), relations of the steel plate temperature, the steel plate thickness, the mode converted wave time of flight $t_{SL}$, and the longitudinal wave time of flight $t_{2L}$ were established. The relations for L=4 mm are shown in FIG. 10. By using the relations shown in FIG. 10, the material thickness D was calculated. According to the relations shown in FIG. 10, for example, if $t_{2L}'=4.21\ \mu s$ and $\Delta t_{SL}=2.16\ \mu s$, then $t_{2L}=4.21\ \mu s$ and $t_{SL}=6.37\ \mu s$. Therefore, as shown in FIG. 10, it is clear that the thickness of this steel plate is 10.7 mm and that the steel plate internal temperature during the measurement was approximately 800° C.

Values of the steel plate thickness measured under different temperatures by using the above-mentioned method and apparatus according to the invention are shown in the following Table 1.

TABLE 1

| | Steel Plate Temperature | | | |
|---|---|---|---|---|
| | 25° C. | 700° C. | 800° C. | 1000° C. |
| Conventional Method (mm) | 10.7 | 10.9 | 11.0 | 11.2 |
| Method According to the Invention | 10.7 | 10.8 | 10.8 | 10.8 |

The steel plate thickness is measured 0.1 mm larger at a temperature of 700° C. or more. This substantially matches the predicted thermal expansion amount of a steel plate. It was confirmed that by using the method and the apparatus of this invention, even if the material temperature significantly changes, the material thickness can be measured with high accuracy and in a non-contact manner without having a pyrometer or a plurality of sensors. Meanwhile, in order to compare the method of this invention with a conventional method, the surface temperature of the steel plate was measured by a pyrometer during the above measurement, and the results of calculating the material thickness from the longitudinal wave time of flight and the temperature measurement value are also shown in Table 1. In the conventional method, even if the temperature change is corrected by a pyrometer, the measurement error at high temperatures becomes large. This error is supposed to be caused by a difference between the surface and the internal temperature of the steel plate, and/or by a change in emissivity of the steel plate.

As explained above, if this invention is used, the material thickness can be measured with high accuracy and in a non-contact manner even in a measurement environment in which the temperature of the measured material significantly changes. Furthermore, the longitudinal wave and the mode converted wave can be simultaneously detected by a single laser irradiating device and a single ultrasonic wave detector. There is no need for separately arranging a temperature measurement sensor such as a pyrometer, so there is an effect that the total measuring system can be made smaller and the cost can be lower.

Additionally, an ultrasonic wave can be transmitted in non-contact manner by an optical method, so the distance between the surface of the measured material and the measuring device can be very long (e.g., 500 mm). Therefore, this can be applied to a material which moves at a high speed and/or to a material with a high temperature. Furthermore, the measured object is not limited to a conductive material, as it is in an electromagnetic acoustic transducer method, and the measurement is not significantly affected by a standoff change due to a change of the material thickness. Therefore, for example, this can also be applied to thickness measurement of a stainless steel plate, or to a manufacturing line which processes a material of which the thickness changes by approximately several mm. Furthermore, the material internal temperature can also be detected, in addition to the material thickness, so this can also be applied to the evaluation of material qualities that depend on the material temperature in a manufacturing line or the like.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. A material thickness measuring apparatus, comprising:
   a laser irradiating device that irradiates a laser beam onto a first surface of a material and thereby generates ultrasonic waves inside the material;
   an ultrasonic wave detector that detects an ultrasonic longitudinal wave and a mode converted wave reflected by a second surface of the material, and outputs a detection signal;
   a time of flight measuring device that measures times of flight, in the material, of the ultrasonic longitudinal wave and the mode converted wave based on the detection signal; and
   a calculator that calculates a thickness of the material based on the times of flight and a correlation, which was obtained in advance, between longitudinal and shear wave velocities of the material and temperature of the material.

2. The material thickness measuring apparatus as set forth in claim 1, wherein the ultrasonic wave detector comprises a laser oscillation device and an optical interferometer.

3. The material thickness measuring apparatus as set forth in claim 1, wherein a position at which a laser beam is irradiated by the laser irradiation device and a position at which the ultrasonic wave detector performs ultrasonic wave detection are substantially the same position.

4. The material thickness measuring apparatus as set forth in claim 1, wherein a position at which a laser beam is irradiated by the laser irradiation device and a position at which the ultrasonic wave detector performs ultrasonic wave detection are separated by a separation distance.

5. The material thickness measuring apparatus as set forth in claim 4, wherein the separation distance is in a range of from about 1 mm to about 12 mm.

6. The material thickness measuring apparatus as set forth in claim 4, wherein the separation distance is in a range of from about 2 mm to about 8 mm.

7. A metal manufacturing line having the material thickness measuring apparatus of claim 1 incorporated therein.

8. A method of measuring a material thickness, comprising:
   generating ultrasonic waves inside a material by irradiating a laser beam onto a first surface of the material;
   detecting an ultrasonic longitudinal wave and a mode converted wave reflected by a second surface of the material, and outputting a detection signal;
   measuring times of flight, in the material, of the ultrasonic longitudinal wave and the mode converted wave based on the detection signal; and
   calculating a thickness of the material based on the times of flight and a correlation, which was obtained in advance, between longitudinal and shear wave velocities of the material and temperature of the material.

* * * * *